United States Patent [19]

Harvey et al.

[11] Patent Number: 5,136,716
[45] Date of Patent: Aug. 4, 1992

[54] SESSION CONTROL IN NETWORK FOR DIGITAL DATA PROCESSING SYSTEM WHICH SUPPORTS MULTIPLE TRANSFER PROTOCOLS

[75] Inventors: George A. Harvey, Maynard, Mass.; Gerard Koning, Brookline, N.H.; William Hawe, Pepperell; Anthony Lauck, Wellesley, both of Mass.; David Oran, Bloomington, Ind.; John Harper, Basingstoke; Kevin Miles, Reading, both of England

[73] Assignee: Digital Equipment Corporation, Maynard, Mass.

[21] Appl. No.: 492,381

[22] Filed: Mar. 8, 1990

Related U.S. Application Data

[63] Continuation of Ser. No. 94,306, Sep. 4, 1987, abandoned.

[51] Int. Cl.$^5$ .............................................. G06F 3/00
[52] U.S. Cl. .................................. 395/800; 395/200; 364/240.8; 364/242.5; 364/242.2; 364/DIG. 1
[58] Field of Search ... 364/200 MS File, 900 MS File; 370/94.1, 85.1, 61, 84; 395/800, 200, 325

[56] References Cited

U.S. PATENT DOCUMENTS

| | | | |
|---|---|---|---|
| 4,281,315 | 7/1981 | Bauer et al. | 364/200 |
| 4,644,470 | 2/1987 | Feigenbaum et al. | 364/200 |
| 4,648,061 | 3/1987 | Foster | 364/900 |
| 4,688,170 | 8/1987 | Waite et al. | 364/200 |
| 4,701,841 | 10/1987 | Goodrich et al. | 364/200 |
| 4,734,853 | 3/1988 | Nakano | 364/200 |
| 4,756,007 | 7/1988 | Qureshi et al. | 370/84 X |
| 4,787,028 | 11/1988 | Finfrock et al. | 364/200 |
| 4,788,657 | 11/1988 | Douglas et al. | 364/900 |
| 4,941,084 | 7/1990 | Terada et al. | 364/200 |

FOREIGN PATENT DOCUMENTS 61-127251 6/1986 Japan.
62-197850 9/1987 Japan.

OTHER PUBLICATIONS

Larry L. Peterson, "A Yellow-Pages Service for a Local-Area Network", Communications of the ACM, Special Issue, Aug. 11-13, 1987, pp. 235-242.
Mockapetris et al., "A Perspective on Name System Design", Proceedings IEEE INFOCOM, 1985, pp. 349-355.
Multiple-Protocol LAN Interface for IBM 370 Systems, IBM Technical Disclosure Bulletin, vol. 29, No. 9, Feb. 1987.
Fleisch, "Distributed System V IPC in Locus: A Design and Implementation Retrospective", Computer Communication Review (SIGCOMM '86 Symp. Communications; Architectures & Protocols), vol. 16, No. 3, Aug. 5-7, pp. 386-396.

Primary Examiner—Thomas C. Lee
Assistant Examiner—Mehmet Geckil
Attorney, Agent, or Firm—Fish & Richardson

[57] ABSTRACT

A distributed digital data processing system includes a plurality of nodes which communicate over a network. A node maintains one or more objects, each of which may be a file, that is, an addressable unit in the system, such as a program, database, text file, or the like, or a directory which may contain one or more files or other directories. One node maintains a naming service which associates each object in the system with one or more protocol towers. Each protocol tower identifies the object name and a series of entries each identifying a name for each of the protocol layers, along with the communications parameters and address information, to be used in communicating with the object. When a node requires access to an object maintained by another node, it first retrieves from the naming service the protocol towers for the object. The node also maintains a tower identifying the names of each of the protocols over which it can communicate. The node then compares the protocol names in the retrieved protocol towers with the protocol names over which it can communicate. If the protocol names in a retrieved tower match the protocol names in the node's tower, the node uses the communications parameters and address information in future communications with the object. If the node is unable to identify a retrieved protocol tower which matches its supported tower or towers, it is unable to communicate with the object.

12 Claims, 2 Drawing Sheets

SESSION CONTROL

SESSION CONTROL IN NETWORK FOR DIGITAL DATA PROCESSING SYSTEM WHICH SUPPORTS MULTIPLE TRANSFER PROTOCOLS

This is a continuation of copending application Ser. No. 094,306, filed on Sep. 4, 1987, now abandoned.

BACKGROUND OF THE INVENTION

1. Field of the Invention

The invention relates generally to the field of digital data processing systems and more specifically to networks for use in connection with distributed systems.

2. Description of the Prior Art

A digital data processing system, or computer, typically includes a processor, associated memory and input/output units enabling a user to load programs and data into the computer and obtain processed data therefrom. In the past, computers were expensive, and so to be cost effective had to support a number of users. More recently, however, the cost of computers, particularly the processors and memories, has decreased substantially, and so it is relatively cost effective to provide a computer to one or at most only a few users.

A benefit of providing only a single computer for a large number of users was that the users could easily share information. Thus, for example, if all persons working in a bookkeeping or accounting department use a single common computer, they may maintain common accounting and bookkeeping databases up to date, and when necessary accounting reports may be generated from those databases. However, if they use separate computers, the data is stored in separate databases, on each computer, and so generating accounting reports would be more difficult.

As a result, networks were developed to provide a distributed computer system, that is, a system which permits diverse computers to communicate and transfer data among them. In addition, the networks allow the sharing of expensive input/output devices, such as printers and mass storage devices, and input/output devices which may be rarely used, such as links to the public telecommunications network. In a network, each computer is a node which communicates with other nodes over one or several wires. In addition, nodes may be provided which store and manage databases or other data files on mass storage devices, or which manage printers or links to the public telecommunications network.

A problem arises with networks, however, since each computer manufacturer essentially has a different protocol for allowing nodes to communicate over the networks. For example, computers from International Business Machines, Inc., communicate using a System Network Architecture ("SNA") protocol standard, computers from Digital Equipment Corporation communicate using a Digital Network Architecture ("DNA") protocol standard, and Univac computers communicate using a DCA protocol standard. In an effort to establish protocol standards to allow computers and other nodes from diverse manufacturers to communicate, the International Standards Organization (ISO) has established an Open Systems Integration (OSI) protocol standard.

One similarity among all of the protocols is that each is divided into a plurality of layers, with each layer providing services to the communication. For example, the OSI protocol includes seven layers. Low layers control the generation and reception of electrical signals over the communications medium to allow the communication of individual bits, the sequencing of the bits into blocks, and the determination of the node which is to respond to the signals. Intermediate layers control the sequencing of blocks of received bits into messages of data in case the blocks are received out of order, and the division of data messages into blocks for transmission over the network if the network cannot transmit an entire message in a block. In addition, another intermediate layer controls the transfer of data to and from the proper programs which may be running on the node. Upper layers control the transfer of data to and from the programs running on the node and the addition of error detection and correction information and its decoding to ensure proper receipt of the data. While the protocols are all divided into layers, the services provided by each of the layers are diverse, as is the mechanism for communicating among the layers.

SUMMARY OF THE INVENTION

The invention provides a new and improved distributed computer system which permits nodes to communicate over a network using a plurality of diverse communication protocols.

In brief summary, the new system includes a plurality of nodes which communicate over a network. A node maintains one or more objects, each of which may be a file, that is, an addressable unit in the system, such as a program, database, text file, or the like, or a directory which may contain one or more files or other directories, or any other addressable resource in the system. One node maintains a naming service which associates each object in the system with one or more protocol towers. Each protocol tower identifies the object name and a series of entries each identifying a protocol name for each of the protocol layers, along with the communications parameters and address information, to be used in communicating with the object. When a node requires access to an object maintained by another node, it first retrieves from the naming service the protocol towers for the object. The node also maintains a tower identifying the names of each of the protocols over which it can communicate. The node then compares the protocol names in the retrieved protocol towers with the protocol names over which it can communicate. If the protocol names in a retrieved tower match the protocol names in the node's tower, the node uses the communications parameters and address information in future communications with the object. If the node is unable to identify a retrieved protocol tower which matches its supported tower or towers, it is unable to communicate with the object.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
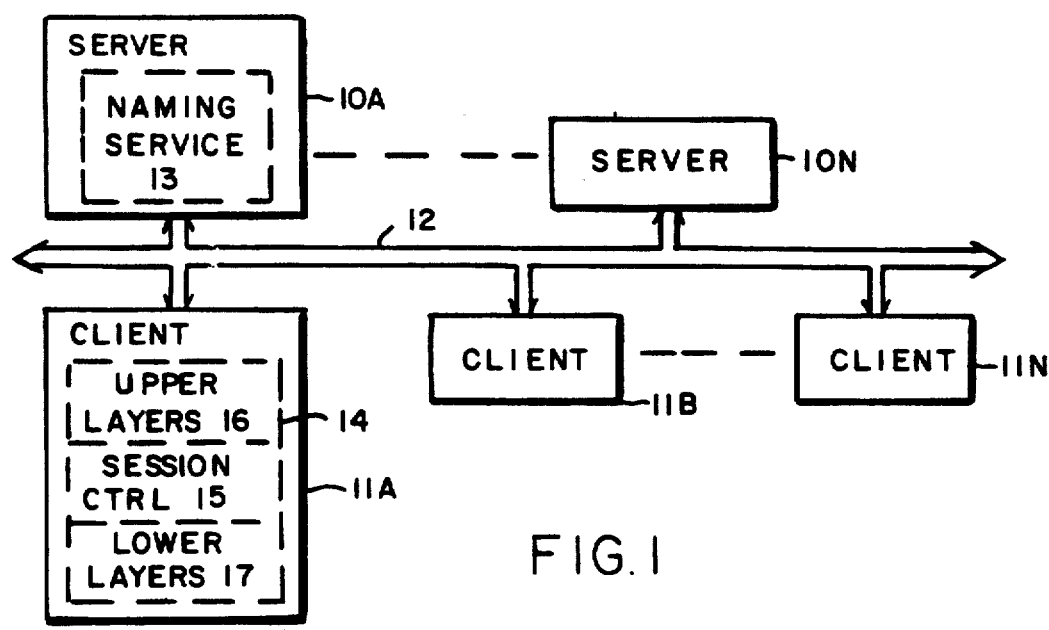
FIG. 1 is a general block diagram of a distributed digital data processing system constructed in accordance with the invention.

FIG. 1 is a general block diagram of a distributed digital data processing system constructed in accordance with the invention. With reference to FIG. 1, the system includes a plurality of nodes, including server nodes 10A through 10N (generally identified by reference numeral 10) and a plurality of client nodes 11A through 11N (generally identified by reference numeral 11) interconnected by a communications link 12. The server nodes 10 provide a number of services to client nodes 11. The client nodes 11 are used by users to perform or initiate data processing. Examples of services provided by server nodes 11 include printing and telecommunications services, data processing, mass storage backup of data which is processed by the client nodes 11 or by a server node 10, and common database control for client nodes 11, allowing a plurality of client nodes to access a common database. It will be appreciated that not all server nodes provide all of such services to the client nodes 10; in some cases, one or only a few server nodes 10 may provide a particular service to the client nodes 11. In addition, some of the server nodes 10 may provide multiple services to the client nodes 11.

At least one server node 10 in the system provides a naming service 13. In brief, a naming service provides from a single location, namely the server node containing the naming service, the location of any object in server nodes 10 and client node 11 and which may be accessed by a client node 11. An object is typically an file, for example, a program or a data file, which is identified by a name, or a directory, which may contain a file or other directory, which is also identified by a name, or any other addressable resource in the system. A client node 11 which requires access to an object, provides the naming service 13 with the name of the object, and the naming service identifies the client node 11 or server node 10 which controls the object and through which the object can be accessed.

Each client node 11 also includes a multiple-layer message section 14 including a session control layer 15, a set of upper layers 16 and a set of lower layers 17. Each of the layers in message section 14 is used to enable the transmission and reception of messages over communications link 12. The lower layers 17 facilitate the generation and reception of electrical signals over the communications medium to allow the communication of individual bits, the sequencing of the bits into blocks, the determination of the node which is to respond to the signals and the sequencing of blocks of received bits into messages of data in case the blocks are received out of order, and the division of data messages into blocks for transmission over the network if the network cannot transmit an entire message in a block. The upper layers 16 control the transfer of data to and from the programs running on the node and the addition of error detection and correction information and its decoding to ensure proper receipt of the data. The session control 15 controls the transfer of data to and from the proper programs which may be running on the node.

Figure 2:
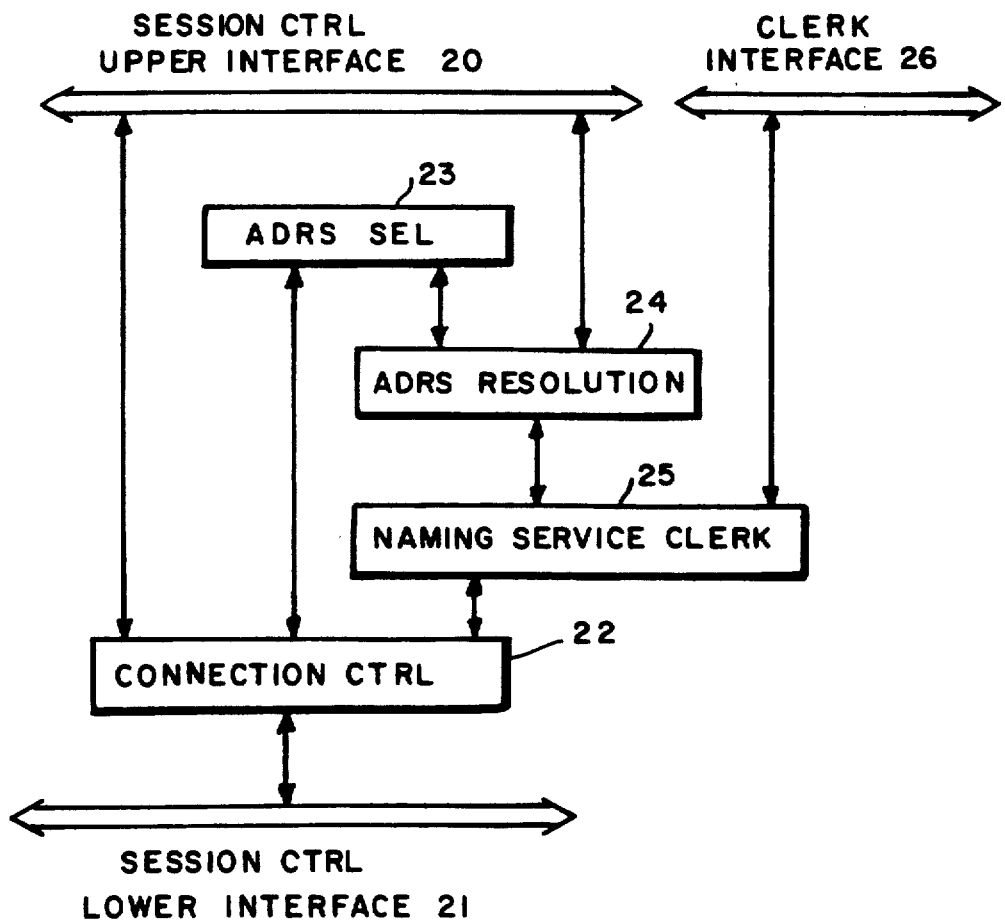
FIG. 2 is another block diagram useful in understanding the invention.

FIG. 2 depicts details of the session control 15 on a client 11. With reference to FIG. 2, the session control includes an upper interface module 20 which provides a uniform interface to the upper layers 16, and more specifically to programs which run on client 11, and a lower interface module 21 which provides an interface to the lower layers 17 in the message section 14. A connection control module 22 processes transmission requests which are received at upper interface module 20 passes them to the lower layers 17. If a virtual circuit does not exist for transferring messages, the connection control module 22 enables the lower layers 17 to establish a virtual circuit in a conventional manner. In addition, if a virtual circuit does exist, the connection control module 22 enables the lower layers 17 to perform a transfer using the virtual circuit.

In connection with receipt of messages from the lower layers 17, the connection control 22 routes the messages to the upper layers 16 so as to ensure delivery to the proper users or applications programs. If a message requests a program which is not running, the connection control 22 enables the client node 11 to begin processing the program.

When the connection control 22 receives a request, including an object name, from the upper interface 20 to initiate a transfer for which no virtual circuit exists, the connection control 22 first passes the request to an address selection module 23 to obtain an address for use in the message to be transmitted over the communications link 12 to identify the intended recipient. The address selection module 23 maintains a cache (not shown) of object names and addresses and if the object name is in the cache, the address selection module may pass the address directly to the connection control module 22.

Alternatively, if the object name is not in the cache, the address selection module 23 passes the object name to an address resolution module 24. The address resolution module then passes the object name to a naming service clerk module, which uses a clerk interface 26 to obtain from a server node 10 all protocol towers relating to the object name.

Figures 3A, 3B:
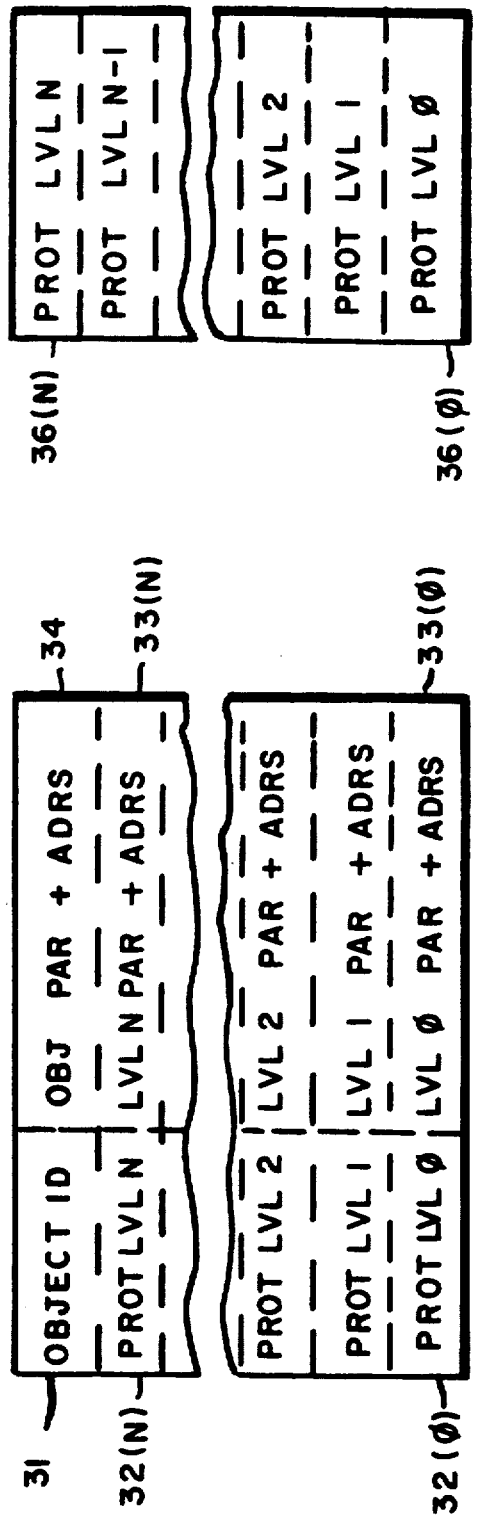
FIGS. 3A and 3B are diagrams of data structures which are useful in understanding the operation of the system depicted in FIGS. 1 and 2.

With reference to FIG. 3A, a protocol tower 30 is a data structure having a plurality of entries, each with at least two fields. The first entry is an object name entry, which begins with an object name field 31. Each of the other entries is a protocol name entry which contains as a first field a protocol name field 32(0) through 32(N) (generally identified by reference numeral 32). In each of the protocol name entries is a parameter and address information field 33(0) through 33(N) (generally identified by reference numeral 33) each containing parameter and address information. The object name entry may also contain a parameter and address field 34 which contains parameter and address information.

Each object which is maintained in the system depicted in FIG. 1 and which can be obtained by a client node 11 from other nodes 10 and 11 has one or more associated protocol towers 30. Each protocol tower 30 identifies, in the sequential protocol name fields 32, the names of the protocols through which the object may be accessed. In addition, in the protocol tower, in the parameter and address information fields 33, identifies the parameters which are used in transferring through each of the layers and the address information which is used in messages transmitted over communications link 12 to enable the object to be accessed.

With reference again to FIG. 2, the naming service clerk module 25, on request from the address resolution module 24, obtains, from the naming service 13 and through clerk interface 26, all of the protocol towers associated with an object name, and transfers them to the address resolution module 24. The address resolution module 24 also maintains a set of protocol identification tables. One such protocol identification table 35 is depicted in FIG. 3B. With reference to FIG. 3B, a protocol identification table 35 includes a plurality of entries 36(0) through 36(N) (generally identified by reference numeral 36) which sequentially contain the names of the sequential protocol layers which the client node 11 can support.

Upon receiving the protocol towers 30 associated with the object identified in the request from the upper interface module 20 from the naming service clerk module 25, the address resolution module 24 then iteratively compares the contents of the entries 36 to the entries 32 to determine if the sequence of names in the entries in the protocol identification table 35 correspond to the sequence of names in a protocol tower. If there is a match, the address resolution module 24 passes the protocol tower 30 which provided the match to the address selection module 23, which caches the protocol tower 30. The address selection module 23 also passes the protocol tower to the connection control module 22, which uses the parameter and address information from the parameter and address fields 33 in each of the entries in enabling the lower layers 17 (FIG. 1) to engage in transferring messages over communications link 12.

If, on the other hand, the address resolution module 24 determines that there is no protocol tower whose sequence of protocol names 32 corresponds to the sequence of protocol names in a protocol table 35, the address resolution module notifies the address selection module 23, which in turn notifies the connection control module 22. The connection control module 22, in turn, notifies the user or applications program which made the request that it is unable to satisfy the request. The user or applications program may then take selected error recovery operations.

It will be appreciated that the invention provides a simplified mechanism for determination of protocols to be used in transferring messages over a communications link 12 in a network. The user at a client node 11 only has to know the name of an object, such as a directory or file, to which access is required, but not the protocol identification or parameters which are required to access the object.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the U.S. is:

1. A system comprising a server node and a client node interconnected by a communications link,
   A. said server node including at least one stored protocol tower means associated in storage with an object name, said protocol tower means comprising a series of entries each containing a communication protocol layer name field containing a protocol name and a parameters and address field;
   B. said client node including:
      i. stored protocol identification table means for maintaining at least one protocol identification table containing a sequence of protocol names;
      ii. protocol tower retrieval means responsive to a request containing an object name for enabling the retrieval from said server node over said communications link of all said protocol tower means associated in storage with the object name;
      iii. protocol tower identification means connected to said protocol identification table means and said protocol tower retrieval means for iteratively comparing the protocol names in each of said retrieved protocol tower means with the protocol names in the protocol identification table to identify one of said protocol means that matches said protocol names in said protocol table; and
      iv. parameter and address utilization means connected to said protocol tower identification means for using the contents of said parameter and address field from the protocol tower means identified by said protocol tower identification means in initiating communication between said client node and an object identified by the object name.

2. A system as defined in claim 1 in which said protocol tower identification means continues said comparison until a match is found or said protocol names in said retrieved protocol tower means are exhausted.

3. A system as defined in claim 1 in which said client node further includes means for notifying the source of said request in response to the failure of said protocol tower identification means to identify one of said protocol tower means which matches said protocol names in said protocol identification table.

4. The system of claim 1 wherein said request containing an object name is passed to the communications link by a session control layer comprising a connection control module to establish a virtual circuit between said client node and an object identified by said object name, said connection control module receiving an address of said object name from an address selection module if said object name is present in said address selection module and receiving the address of said object name from said server node if said object name is not present in said address selection module.

5. The system of claim 4 wherein all protocol tower means relating to the object name are obtained from said server node if said address selection module does not contain said object name and address.

6. A client node for connection to a system including a server node and a communications link for interconnecting said server node and said client node, said server node including at least one stored protocol tower means associated in storage with an object name, said protocol tower means comprising a series of entries each containing a communication protocol name field containing a protocol name and parameters and address field, said client node including:
   A. stored protocol identification table means for maintaining at least one protocol identification table containing a sequence of protocol names;
   B. protocol tower retrieval means responsive to a request containing an object name for enabling the retrieval from said server node of all said protocol tower means associated in storage with the object named in said request;
   C. protocol tower identification means connected to said protocol identification table means and said protocol tower retrieval means for iteratively comparing the protocol names in each of said retrieved protocol towers with the protocol names in the protocol identification table to identify one of said protocol tower means that matches said protocol names in said protocol identification table; and D. parameter and address utilization means connected to said protocol tower identification means for using the contents of said parameter and address field from the protocol tower means identified by said protocol tower identification means in initiating communication between said client node and an object identified by the object name.

7. A client node as defined in claim 6 further including means for notifying the source of said request in response to the failure of said protocol tower identification means to identify one of said protocol tower means which matches said protocol names in said protocol identification table.

8. A method for enabling communication between a client node and an object in a system comprising a server node and the client node interconnected by a communications link, comprising the steps of:

A. storing in said server node at least one protocol tower means associated in storage with a name of said object, said protocol tower means comprising a series of entries each containing a communication protocol layer name field containing a protocol name and a parameters and address field;

B. storing in said client node a protocol identification table containing a sequence of protocol names;

C. retrieving by said client node from said server node, in response to a request containing an object name, said protocol tower means associated in storage with the object name;

D. iteratively comparing by said client node the protocol names in each of said retrieved protocol tower means with the protocol names in the protocol identification table to identify one of said protocol tower means that matches said protocol names in said protocol identification table; and E. using by said client node the contents of said parameter and address field from the protocol tower means identified in initiating communication between said client node and an object identified by the object name.

9. A process for use in connection with a processor to implement a client node for connection to a system including a server node and a communication link for interconnecting said server node and said client node, said server node including at least one stored protocol tower means associated in storage with an object name, said protocol tower means comprising a series of entries each containing a communication protocol name field containing a protocol name and parameters and address field, said process comprising:

A. stored protocol identification table process for enabling a processor to maintain at least one protocol identification data structure containing a sequence of protocol names;

B. protocol tower retrieval process for enabling a processor to retrieve, in response to a request containing an object name, over said communications link from said server node all said protocol tower means associated in storage with the object named in said request;

C. protocol tower identification process for enabling a processor to iteratively compare the protocol names in each of said retrieved protocol towers with the protocol names in the protocol identification table to identify one of said protocol tower means that matches said protocol names in said protocol identification table; and D. parameter and address utilization process for enabling a processor to use the contents of said parameter and address field from a protocol tower means identified in initiation communication between said client node and an object identified by the object name.

10. A client node as defined in claim 9 in which said protocol tower identification process continues said comparison until a match is found or said protocol names in said retrieved protocol tower means are exhausted.

11. A system comprising a server node and a client node interconnected by a communications link, A. said server node comprising a series of stored entired containing a communication protocol name and parameters, each entry associated in storage with an object name;

B. said client node including:
  i. stored client protocol names;
  ii. retrieval means for retrieving from said server node of all said protocol names and parameters associated in storage with the object name; and
  iii. identification means connected to the stored client protocol names, and said retrieval means for comparing the retrieved protocol names with the client protocol names to identify one of said retrieved protocol names that matches said client protocol names for use in initiating communication between said client node and an object identified by the object name.

12. A system comprising a server node and a client node interconnected by a communications link, A. said server node including at least one stored protocol tower means associated in storage with an object name, said protocol tower means comprising a series of entries each containing a protocol layer name field containing a protocol name and a parameters and address field;

B. said client node including:
  i. stored protocol identification table means for maintaining at least one protocol identification table containing a sequence of communication protocol names;
  ii. protocol tower retrieval means comprising a sessions control layer including a connection control module, connected to an address selection module and a naming service module, the naming service module obtaining from the server in response to a request containing an object name all protocol towers relating to the object name if said address selection module does not contain said object name and address;
  iii. protocol tower identification means connected to said protocol identification table means and said protocol tower retrieval means for iteratively comparing the protocol names in each of said retrieved protocol tower means with the protocol names in the protocol identification table to identify one of said protocol tower means that matches said protocol names in said protocol identification table;
  iv. means connected to said protocol tower identification means for notifying the sourced of said request in response to the failure of said protocol tower identification means to identify a protocol tower means which matches; and v. parameter and address utilization means connected to said protocol tower identification means for using the contents of said parameter and address field from the protocol tower means identified by said protocol tower identification means in initiating communication between said client node and an object identified by the object name.

* * * * *